US008275630B2

(12) United States Patent
Dunning

(10) Patent No.: US 8,275,630 B2
(45) Date of Patent: Sep. 25, 2012

(54) PERFORMANCE REPORTING FOR PRODUCTS AND SERVICES USING WEB-BASED PORTALS

(75) Inventor: Deborah Dunning, Providence, RI (US)

(73) Assignee: Sphere E, LLC, Providence, RI (US)

( * ) Notice: Subject to any disclaimer, the term of this patent is extended or adjusted under 35 U.S.C. 154(b) by 0 days.

(21) Appl. No.: 13/295,619

(22) Filed: Nov. 14, 2011

(65) Prior Publication Data

US 2012/0123961 A1 May 17, 2012

Related U.S. Application Data

(60) Provisional application No. 61/413,830, filed on Nov. 15, 2010.

(51) Int. Cl.
*G06Q 10/00* (2012.01)
(52) U.S. Cl. ........................................................ 705/1.1
(58) Field of Classification Search ........................ None
See application file for complete search history.

(56) References Cited

U.S. PATENT DOCUMENTS

| | | | | |
|---|---|---|---|---|
| 6,490,569 | B1 * | 12/2002 | Grune et al. .................. | 705/400 |
| 7,092,898 | B1 * | 8/2006 | Mattick et al. ............. | 705/14.41 |
| 2002/0035550 | A1 * | 3/2002 | Sakurai et al. ................ | 705/400 |
| 2003/0125999 | A1 * | 7/2003 | Kobayashi et al. ................ | 705/7 |
| 2004/0162741 | A1 * | 8/2004 | Flaxer et al. ....................... | 705/7 |
| 2004/0260586 | A1 * | 12/2004 | Sakurai et al. ..................... | 705/7 |
| 2005/0267781 | A1 * | 12/2005 | Kobayashi et al. ................ | 705/2 |
| 2006/0100897 | A1 * | 5/2006 | Halloran et al. .................. | 705/1 |
| 2006/0286518 | A1 * | 12/2006 | Yoder ............................ | 434/236 |
| 2010/0030601 | A1 * | 2/2010 | Warther et al. .................... | 705/7 |
| 2010/0305806 | A1 * | 12/2010 | Hawley .......................... | 701/33 |

OTHER PUBLICATIONS

Dunning et al., Presentation to U.S. Senate Energy Committee on *The Green Standard* Jun. 8, 2010.
European Standard, Sustainability of construction works—Environmental product declarations—Core rules for the product category of construction products (Feb. 2011).
Handbook on Life Cycle Assessment, Operational Guide to the ISO Standards, Table of Contents (Printed 2002).
International Organization for Standardization, ISO 14025, Environmental labels and declarations—Type III environmental declarations—Principles and procedures (ISO 14025:2006) (May 2007).
International Organization for Standardization, ISO 14040: Environmental management—Life cycle assessment—Principles and framework (Jul. 1, 2006).
International Organization for Standardization, ISO 14044: Environmental management—Life cycle assessment—Requirements and guidelines (Jul. 1, 2006).
International Organization for Standardization, ISO 14040: Environmental management—Life cycle assessment—Principles and framework (Jun. 15, 1997).

(Continued)

*Primary Examiner* — Jonathan Quellette
(74) *Attorney, Agent, or Firm* — Fish & Richardson P.C.

(57) ABSTRACT

A method includes obtaining performance information from sources, where the performance information relates to products and/or services, enabling the performance information to be reviewed to thereby produce vetted and categorized performance information, receiving the vetted and categorized performance information, where the vetted and categorized performance information includes the performance information that has been vetted for reliability and that has been categorized according to reliability, and using the vetted and categorized performance information to generate reports, where the reports indicate a performance impact of the products and/or services.

27 Claims, 5 Drawing Sheets

OTHER PUBLICATIONS

Life Cycle Assessment and Sustainability, Third in a Series of Annual Reports on the Green Building Movement, A Supplement to Building Design & Construction (Nov. 2005).

Menke et al. of The University of Tennessee, and Brice W. Vignon of Battelle, Evaluation of Life-Cycle Assessment Tools Final Report (Aug. 30, 1996).

Printout of pages from website http://www.bifma.org/standards, as retrieved from the internet on Feb. 23, 2012.

Printout of pages from website http://www.environdec.com, as retrieved from the internet on Feb. 23, 2012.

Scientific Applications International Corporation (SAIC), Life Cycle Assessment: Principles and Practice (May 2006).

Streamlined Life-Cycle Assessment: A Final Report from the SETAC North America Streamlined LCA Workgroup (Jul. 1999).

Zumsteg, Jennifer M. et al., "Systematic Review Checklist: A Standardized Technique for Assessing and Reporting Reviews of Life Cycle Assessment Data", The Journal of Industry Ecology, www.wileyonlinelibrary.com/journal/jie, vol. 16, No. S1, May 2012, (10 pages).

Greenbiz.com, "Life Cycle Assessment: A Guide for Sustainability and Strategy Executives", [online] Retrieved from the Internet:<URL:http://www.greenbiz.com/research/report/2011/05/16/life-cycle-assessment-guidesustainability-and-strategy-executives>, (May 16, 2011).

MacKenzie, D., "Automaker Rankings 2007: The Environmental Performance of Car Companies", Union of Concerned Scientists (Apr. 2007).

\* cited by examiner

Provider Name:
Provider Website
ISO Number(s)            ⟵ 401
Company Name
Product Name
Product Description
Declaration Number
Company Address

Product classification and description
    0.1 Product Description        ⟵ 402
    0.2 Range Application
    0.3 Product Standard
    0.4 Accreditation
    0.5 Delivery Status
        Figure 1. Specification of product construction

1 Material Content
        Figure 2. Diagram of product construction        ⟵ 403
Definitions
    1.1 Material Content
        Figure 3. Material content of the product
    1.2 Production of main materials

2 Product Manufacture
    2.1 Production Process        ⟵ 404
        Figure 4. Diagram of production process
    2.2 Health, safety and environmental aspects during production

3 Delivery and installation of floor covering
    3.1 Delivery
    3.2 Installation        ⟵ 405
    3.3 Health, safety and environmental aspects during installation
    3.4 Waste
    3.5 Packaging

4 Use Stage
    4.1 Use of the floor covering        ⟵ 406
        4.1.1 Cleaning and maintenance
    4.2 Health aspects during usage

FIG. 4A

5 Singular Effects — 407
  5.1 Fire
  5.2 Water Damage
  5.3 Mechanical damage

6 End of Life — 408
  6.1 Recycling or reuse
  6.2 Disposal

7 Life Cycle Assessment
  7.2 Functional Unit
  7.3 Cut-off criteria
  7.4 Allocation
  7.5 Background data — 409
  7.6 Data Quality
  7.7 System Boundaries
  7.8 Notes on use stage
  7.9 Results of the assessment
    Figure 5. Life cycle stages diagram
  7.10 Life cycle inventory assessment
    Figure 6. Use of total primary energy for the all life cycle stages from nonrenewable and renewable resources
    Figure 7. Relative total primary energy by life cycle stage
    Figure 8. Total primary energy of all life cycle stages from nonrenewable resources by source type
    Figure 9. Contribution of different resources to nonrenewable primary energy
    Figure 10. Total primary energy of all life cycle stages from renewable resources by source type
    Figure 11. Relative renewable primary energy by source type
      Non-renewable material resources, water consumption and wastes
    Figure 12. Nonrenewable material resources and Water Consumption by life cycle stages
  7.11 Life cycle impact assessment
    Figure 13. The potential impacts for one square meter of carpet
    Figure 14. Life cycle stages as a percentage of total impacts
    Figure 15. Distribution of the environmental impacts to the different stages of the life cycle
    Figure 16. Reduction in impact due to recycled content in the yarn and backing.
  7.12 Interpretation — 410

8 Additional Information, evidence and test results
  8.1 Emissions

9 References — 411

FIG. 4B

PERFORMANCE REPORTING FOR PRODUCTS AND SERVICES USING WEB-BASED PORTALS

CROSS-REFERENCE TO RELATED APPLICATION

This patent application claims priority to U.S. provisional application No. 61/413,830 filed on Nov. 15, 2010. The contents of U.S. provisional application No. 61/413,830 are hereby incorporated by reference into this patent application as if set forth herein in full.

TECHNICAL FIELD

This patent application relates generally to ranking, and reporting, on performance information of systems, such as products and/or services.

BACKGROUND

Life cycle assessment (LCA) was established as a scientific methodology for measuring a product's exchanges with the environment. LCA was established by a committee of global environmental scientists working within the framework of the International Organization for Standardization (IS). Their work resulted in three ISO standards currently in broad global use: (1) standard 14040 for establishing core principles of LCA methodology, (2) standard 14044 for determining processes for developing LCAs, and (3) standard 14025 for setting requirements for development of Type III eco-labels called Environmental Product Declarations (EPDs). The standard for EPDs was released by ISO in 2006 to provide specifiers and purchasers of types of products and services with relevant performance information on a particular product in one source, with that information verified as complete by an independent expert.

EPDs are based on an ISO-compliant full LCA that has been verified by an outside LCA practitioner as meeting the data collection and calculation processes set forth in Product Category Rules (PCRs) for a relevant product type. EPDs provide scientifically robust and transparent information on performance aspects of products or services. To use the term EPD, a report must meet the requirements set forth in standard 14025 of the ISO. The three core requirements of standard 14025 are that: (1) PCRs that are peer-reviewed and expert-approved are used as the framework for developing an LCA, (2) the resulting LCA is reviewed by an independent party expert to determine that it was developed in alignment with requirements of relevant PCRs for scope of data, measurement units, and data calculation processes, and (3) the resulting EPD report is (i) signed and verified by an independent expert as providing relevant performance information, and (ii) registered in an EPD program operated in accordance with ISO Standard 14025.

As explained in standard 14025, "{t}ype III environmental declarations present quantified environmental information on the life cycle of a product to enable comparisons between products fulfilling the same function. Such declarations are provided by one or more organizations, are: based on independently verified life cycle assessment (LCA) data, life cycle inventory analysis (LCI) data or information modules in accordance with the ISO 14040 series of standards and, where relevant, additional environmental information, are developed using predetermined parameters, and are subject to the administration of a programme operator, such as a company or a group of companies, industrial sector or trade association, public authorities or agencies, or an independent scientific body or other organization."

Additional helpful descriptions can be found at www.environdec.com and are reproduced below:

"{a}n EPD is a standardized (ISO 14025/TR) and LCA based tool to communicate the environmental performance of a product or system, and is applicable worldwide for all interested companies and organizations.

{An EPD} . . . includes information about the environmental impacts associated with a product or service, such as raw material acquisition, energy use and efficiency, content of materials and chemical substances, emissions to air, soil and water and waste generation. It also includes product and company information.

An {EPD} presents quantified environmental information for products or services based on information from a LCA conducted according to the ISO-standards for LCA. EPD is voluntarily developed information and the purpose is to provide quality-assured and comparable information regarding environmental performance of products."

EPDs are scientifically robust in that the information that they provide has been generated using accepted scientific methodologies established by environmental scientists serving in workgroups that were created and managed by ISO. EPDs are transparent in that the PCRs on which they are based are readily accessible, and the resulting LCAs are given a critical review for completeness, comparability and transparency by experts with demonstrated knowledge of LCA methodologies and practical knowledge of the relevant industry.

While EPDs are considered by experts in product evaluation to provide substantive and transparent bases for performance evaluation of a product or service, not all products and services have registered EPDs. For many products, the only information that is available and that is verified by an independent expert is that a product or service has met the benchmarks to be certified to a given standard. That given standard's eco-label may therefore be used. In ISO terms, this is a Type 1 eco-label. Its certification may lack grounding in ISO standards and/or transparency as to what data was collected and as to how the data was assessed and used to meet a given certification level. That environmental and other performance information may be certified by differing standards, each with a different basis (as opposed to all being ISO-based), and the details of each of these standards is not readily known or recognized across industries and in multiple countries. Consequently, the information that such certifications impart can be of limited use.

SUMMARY

This patent application describes methods and apparatus, including computer program products, for reporting on performance information of systems, such as products and/or services.

Described herein is a method performed using one or more servers, which comprises obtaining performance information from sources, where the performance information relates to products and/or services, and enabling the performance information to be reviewed to thereby produce vetted and categorized performance information. The method also comprises receiving the vetted and categorized performance information, where the vetted and categorized performance information comprises the performance information that has been vetted for reliability and that has been categorized according to reliability, and using the vetted and categorized performance information to generate reports, which indicate a performance impact of the products and/or services. The method may include any one or more of the features described herein either alone or in combination, examples of which are as follows.

The vetted and categorized performance information may comprise environmental information that has been vetted for scientific robustness and transparency and that has been categorized according to scientific robustness and transparency. Obtaining the performance information may comprise providing templates to the sources, where the templates comprise fields that correspond to parameters that comprise the performance information, and extracting the parameters from the templates. The templates may be provided by hosting Web-based portals containing the templates. The Web-based portals may be accessible via a network. The performance information may be obtained by interacting with information databases to extract the performance information from the databases.

Using the vetted and categorized performance information to generate reports may comprise receiving product or service information from an information management system, correlating the product or service information to the vetted and categorized performance information, and incorporating the vetted and categorized performance information into the report.

The vetted and categorized performance information may be ranked based on at least one of meeting data currency, data comprehensiveness, alignment with relevant product category rules, independent expert verification and transparency of data sources, and calculation processes. The ranking produces ranked information, which is part of the reports.

The information management system may support a building information modeling system. The performance information may comprise first information corresponding to a scientific methodology used to generate the performance information, and second information corresponding to data upon which the scientific information is based.

Scientific robustness may be measured based on compliance at least with ISO 14044 and ISO 14040 circa 2010.

Any two or more of the features described in this patent application, including this summary section, may be combined to form embodiments not specifically described in this patent application.

All or part of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompanying drawings and the description below. Further features, aspects, and advantages will become apparent from the description, the drawings, and the claims.

DESCRIPTION OF THE DRAWINGS

FIG. 4 shows an example of a template used in the processes of FIGS. 1 and 3.

Like reference numerals indicate like elements.

DETAILED DESCRIPTION

Figure 1:
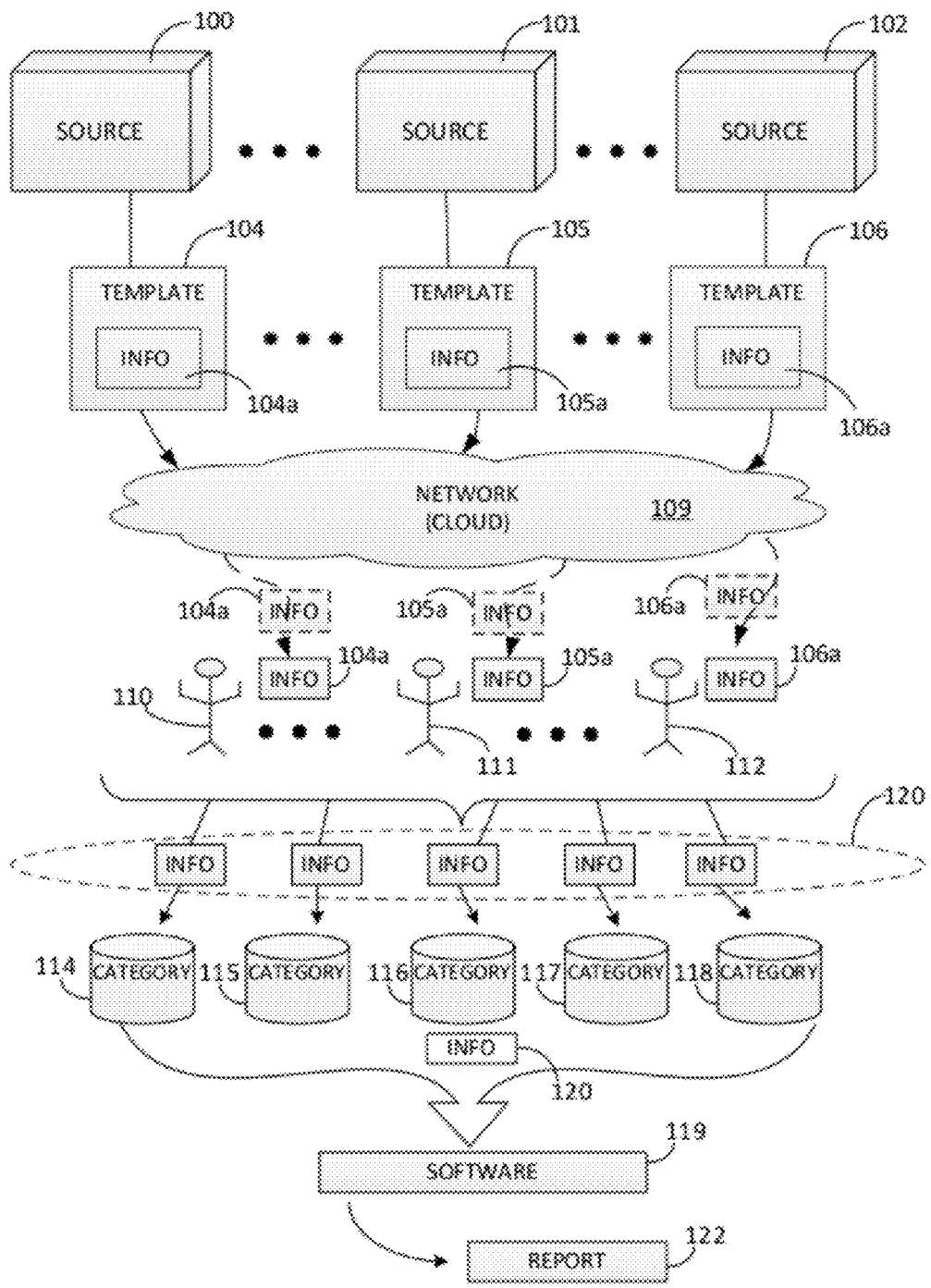
FIG. 1 is conceptual view of processes for reporting on environmental and other performance impacts of products and/or services.

Described herein are processes for ranking and reporting on environmental and sustainability performance of products and/or services produced in regions (e.g., all regions) of the world. Implementations of the processes may include design and business processes for collecting, ranking, and organizing diverse types of performance information into new datasets rated by experts for currency and quality of data, level and quality of verification by outside experts, and degree of transparency, and generating reports using those datasets. Implementations of the processes may include ranking data developed using the ISO 14000 series of standards for LCA core principles methodology and application, while also including other types of performance information which need not be LCA-based. In some implementations, the processes may also include development and use of performance datasets that are expressed in the form of customized reports that feature expert vetted and ranked performance data and information. Users may choose to access the data and reports in a stand-alone format or via a number of interfaces within software tools such as accounting tools like the Global Reporting Initiative, building information modeling (BIM) software programs, green building tools detailing credits like Green Globes and LEED, specifying software like the CSI's Green Format, and ERP software.

This patent application also describes processes for reporting on performance information of systems, such as products and/or services. The performance information may include, but is not limited to, information relating to: environmental impact, human health, mechanical, safety, risk management, and other impacts.

In an implementation, the processes described herein provide Web-based portals that offer product evaluators, specifiers and purchasers as well as sustainability consultants and corporate social report directors access to product and service performance information. The processes may also provide expert assessment on levels of scientific robustness and transparency of information determined by product performance experts. The Web-based portals may use cloud computing to access diverse types of performance information on products and services developed by a wide range of enterprises working globally, some for profit, some not for profit.

The performance information may be organized into datasets and reviewed by expert(s) before it is made available through the Web-based portals. One aspect of the expert review may include determining the level of use of LCA core principles and methodologies (as defined by ISO) associated with the performance information. To support this assessment, a ranking process may be used to support expert reviewers in organizing diverse types of performance information into different spheres based on their LCA data quality and transparency, as shown below.

Sphere One:
ISO-compliant LCA data based on expert approved PCRs used to develop an EPD encompassing all relevant performance data Sphere Two:
ISO-compliant LCA data based on PCRs and third party expert verified information, yet not used in an EPD Sphere Three:
LCA data developed in alignment with ISO standards 14040 (core principals), 14044 (LCA methodology) yet not based on PCRs nor verified by a third party expert Sphere Four:
   LCA data developed information without alignment to ISO standards 14040 (for core principles) and 14044 (LCA methodology) yet not based on PCRs nor verified by a third party expert Sphere Five:
   No process LCA provided or recorded by the manufacturer in connection with any eco-label.

The ranking process may include a numerical rating system, like that shown below, that provides a numeric value to factors such as currency of data, comprehensiveness of data, alignment with relevant PCRs, level and thoroughness of independent expert verification, and degree of transparency on data sources and data calculation processes.

In this example, in the ranking process, each of five (5) factors may be rated on a spectrum ranging from 0 to 2.0, with a cumulative score of 10 being the highest possible score. The 0 to 2.0 ranking is an example. Other number may be used, and other factors may be rated. Examples of factors and their ratings are shown below.
   Factors to be Rated
   Currency of data
   Comprehensiveness of data
   Alignment with PCRs
   Quality of independent expert verification
   Level of transparency of data sources & calculation processes An example rating is shown in the table below.

| Weight | Factor | Poor | Fair | Good | Very Good | Excellent |
|---|---|---|---|---|---|---|
| 2 | Currency of Data | x | | | | |
| 2 | Scope of Data | | x | | | |
| 2 | PCR Basis | | x | | | |
| 2 | Expert Review | | | | x | |
| 2 | Transparency Level | | | | | x |

In some examples, the Web-based portals allow a user to make an informed choice of the type of report needed for a particular application, enabling the system to generate the type of report requested. The user may request product performance information on brand products of a given type, for example carpet tile, and the processes described herein may produce an electronic report showing carpet tile products in the relevant geographic region of the world for which there is any level of independently expert verified performance information. Another example may be a report to be used with BIM software.

Thus, the processes described herein include collecting performance information on types of products and/or services from diverse global sources, and reviewing, assessing and assigning a relative value to the performance information according to data currency, comprehensiveness of data, compliance with PCRs developed based on ISO standards, independent expert verification, and transparency of data sources and calculation processes. The processes enable users to access the performance information for diverse purposes, including, e.g., product or service evaluation, specification and procurement, corporate sustainability reporting, regulatory compliance, and other environmental risk management purposes.

The processes include ranking and reporting on environmental and sustainability performance of products and/or services produced in regions of the world (e.g., any region), according to design and business processes for collecting, rating, organizing and reporting publicly diverse types of performance information into new datasets rated by experts for its quality of data, its level of verification by outside experts, and its degree of transparency. In an example implementation, this product and service performance information management system focuses on ranking data developed using LCA methodology as defined by the ISO while, in some implementations, also including other types of performance information which is not LCA-based. The processes include development and use of proprietary performance datasets that are expressed in the form of customized reports that feature expert vetted data that contain environmental and sustainability analytic processes. The reports are accessible through software interfaces, The processes described herein may offer access to performance information on several levels: (1) single visual, (2) multiple visuals, and (3) detailed documentation. In this regard, the processes described herein may be implemented as a stand-alone system. The processes may also be useful in combination with other software programs or systems including, but not limited to, BIM software, ERP software, and green building rating systems.

The Web-based portals enable users to develop customized reports responsive to their needs and enable them to download relevant environmental and other performance documentation gathered from diverse sources through cloud computing and vetted for scientific quality, level of verification, and transparency. Where appropriate, web-based links to these resources may be provided. Major users of the portals may include, but are not limited to, building professionals, business/financial analysts, and corporate and government purchasers.

The foregoing may be achieved by processes for reporting on environmental and other performance impacts of products and/or services. The processes may be implemented using one or more servers, and may include obtaining performance information from sources that relates to products and/or services, vetting the performance information for scientific robustness and transparency to thereby produce documented and reliable performance information, associating the vetted performance information with categories that correspond to levels of scientific robustness and transparency, and using the categories and the vetted performance information to generate reports that provide performance information on the impacts of the products and/or services. The reports may be accessible through the Web-based portals, as described in more detail below.

FIG. 1 shows an example of the foregoing processes conceptually. As shown in FIG. 1, performance information (e.g., environmental and other information) is obtained from various sources 100 to 102. These sources may include, but are not limited to, sustainable product standard developers, product evaluation tools, trade organizations, manufacturers, distributors, and/or other users of building products and services. The performance information may include, but is not limited to, any information that relates to an environmental or sustainability impact of the products and/or services during their life cycle, e.g., from raw materials sourcing, production and finishing, packaging and transportation, use, and disposal and re-purposing. For example, sources may include manufacturers of carpet, and performance information may include information relating to water use associated with various grades of carpet. In another example, sources may include owners of buildings that have HVAC systems, and performance information may include information describing the environmental impacts of the HVAC systems on air quality of buildings.

The performance information, which is also referred to as performance data, may be accessed by users via Web-based portals, e.g., once it has been evaluated, rated and organized. The Web-based portals may be standard Web pages, which can be accessed securely via the Internet. The Web-based portals may include predefined templates, to which performance information may be added by manufacturers or any other entity in possession of the information. The templates may be, e.g., product, manufacturer or industry-specific, and may include predefined fields corresponding to different types of performance information. These fields may ideally be based on PCRs that are standardized for product types developed to meet requirements set forth in ISO standard 14025. Each standard field may include various sub-fields, which may also be product-specific. For example, templates for the carpet industry may include standard fields defined by the relevant PCRs. Different sub-fields may be incorporated for manufacturers of different types of carpet, such as carpet tiles or broadloom carpet. These sub-fields may include performance information specific to the different types of carpet based on the materials contained therein or their production manufacturing or finishing processes.

The templates may also include fields for specifying how the performance information was obtained, and vetting and rating processes, examples of which are described herein. For example, the performance information may include environmental information relating to a product's effects on energy use, water use, renewable energy, human health, waste, indoor air quality, using a particular sustainable product standard. The templates may also include fields indicating the product standard's accreditation, e.g., by the American National Standards Institute (ANSI) or a similar body in another country. The templates may also include ranking processes for determining scientific quality, level of expert verification and degree of transparency. Additionally, the templates may indicate what type of benchmarks were used as the basis of certification and by what entity those were set and whether a transparent process was used for their development. The templates may also include information relating to methodologies by which the performance information was obtained (e.g., if that information is not readily apparent by the standards with which the performance information complies). The templates may correspond to processes for developing EPDs and/or include field(s) indicating that the performance information is from an EPD.

Referring back to FIG. 1, completed templates 104 to 106 containing performance information 104a to 106a may be transmitted from sources 100 to 102 to a network 109. Network 109 may include various computing devices (not shown), which implement cloud computing. Generally speaking, cloud computing includes Web-based processing, in which shared resources, software, and information are provided to computers and other devices on demand over one or more networks, such as the Internet. Computing devices in the "cloud" retrieve the templates, extract the performance information ("info") therefrom, and transmit the extracted information 104a to 106a to reviewers 110 to 112. These reviewers vet the performance information to identify its reliability, e.g., its level of scientific quality, robustness and transparency. The reviewers are experts in their fields, and knowledgeable about both the scientific methodologies (if any) used to obtain the performance information and the standards (if any) with which the performance information is compliant.

In example implementations, the system provides a product category dataset that includes products of a given type that have been certified to some kind of eco-label, making available an assessment of the LCA data quality of like products in a single source.

In this example, the reviewers may review, assess and assign a relative value to the performance information according to levels of scientific robustness and transparency, known in the system as "spheres". In other examples, the reviewers may categorize the environmental information by taking into account additional or different criteria. In the example of FIG. 1, there are five levels of scientific robustness and transparency; however, any number of levels may be used. For example, performance information obtained from an EPD may be associated with a category (e.g., category 114) that has a highest level of scientific robustness and transparency. On the other hand, performance information that includes no supporting information regarding certifications or scientific methodologies may be associated with a category (e.g., category 118) that has a lowest level of scientific robustness and transparency. Performance information 120 that includes scientific methodologies and non-EPD certifications is vetted by the reviewers, and is associated with the appropriate category level 114 to 118.

After the performance information is categorized, the performance information 120 may be used to generate reports 122 indicating, e.g., the environmental impact of products and/or services that have been categorized. The reports may be generated in conjunction with an information management system, such as BIM software 119. For example, a BIM software module may provide a list of products to be used in a building. Environmental information about those products, along with its level of reliability (e.g., scientific robustness and transparency) may be provided in one or more reports. These reports may be used to determine, prior to construction, the environmental impact of the building, and whether the building complies with required standards. The reports may be standardized (e.g., by industry) or customized. The reports may be accessible to third parties via the Web-based portals.

Figure 2:
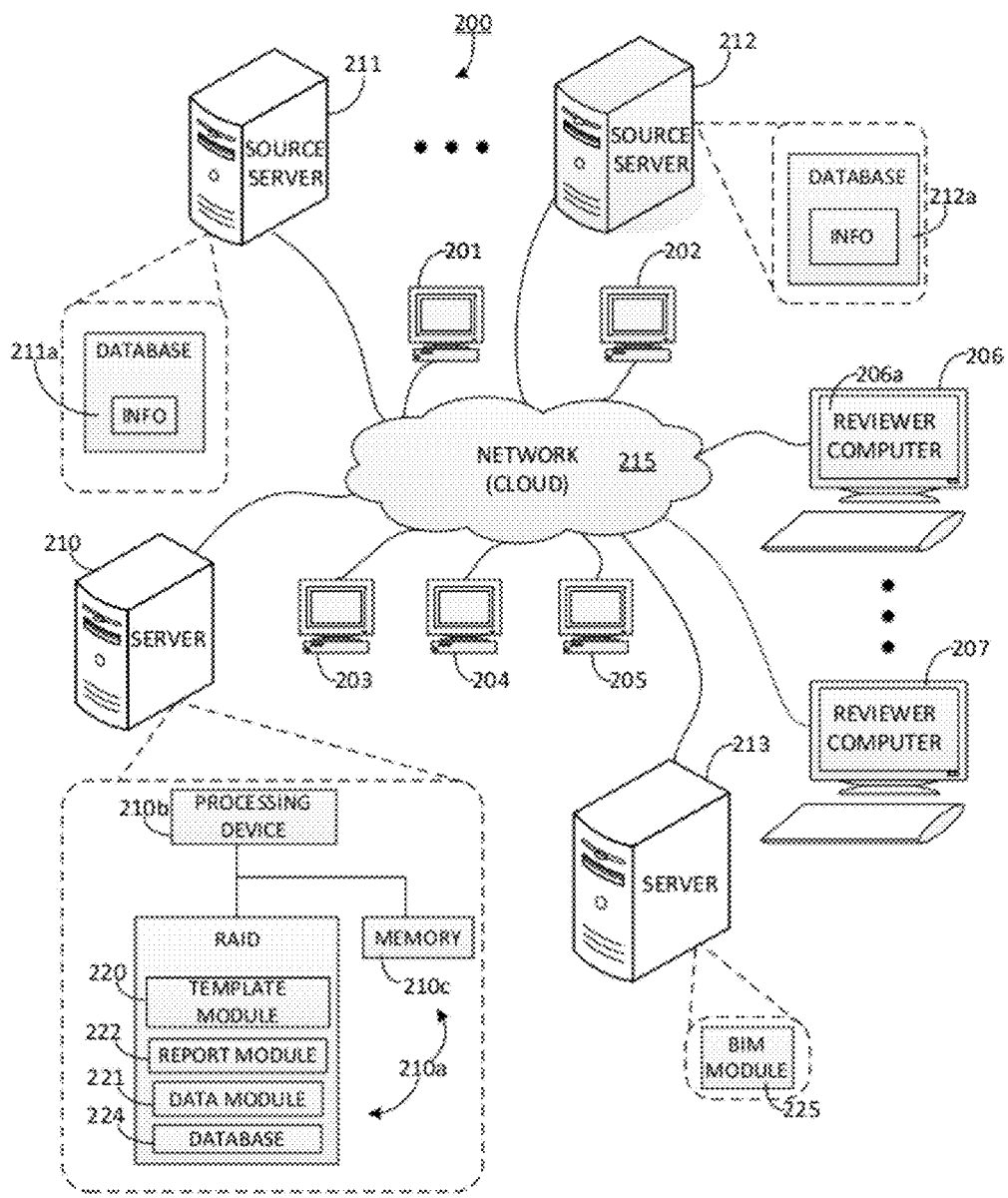
FIG. 2 is a network on which the processes of FIG. 1 may be implemented.

FIG. 2 is an example of network system 200 on which the processes shown conceptually in FIG. 1 may be implemented. It is noted that the network system shown in FIG. 2 is presented merely for illustration. The processes described herein are not limited to use on a network system having the architectural configuration of FIG. 2. Rather, the processes depicted in FIG. 1 can be implemented using any appropriate network, hardware, and/or software architectures.

System 200 includes clients 201 to 207 and servers 210 to 213. The clients and servers are connected via network 215. Network 215 may include one or more networks, such as a local area network (LAN), a wide area network (WAN), and/or the Internet. One or more of the networks that make up network 215 may be wireless, such as a cellular telephone network or a Wi-Fi network. Network 215, in conjunction with one or more of the clients and servers, may form a cloud computing system.

Each client may be a computing device, such as desktop, a laptop, a tablet, a smartphone, or the like. Generally, a smartphone is a mobile device that offers advanced computing capabilities, such as the ability to execute applications and to communicate with a server or another appropriate computing device.

Each client, such as reviewer computer 206, may include a hard drive (not shown) for storing data and computer programs, and a processing device (not shown) (e.g., a microprocessor) and memory (not shown) (e.g., RAM) for executing computer programs. A display screen 206a, such as an LCD (Liquid Crystal Display) or a CRT (Cathode Ray Tube) displays, to a user, images that are generated by the client including, but not limited to, the Web portals, including the templates and reports described herein. As is well known, display on a computer peripheral (e.g., a monitor) physically transforms the computer peripheral. For example, if the computer peripheral is LCD-based, the orientation of liquid crystals can be changed by the application of biasing voltages in a physical transformation that is visually apparent to the user. As another example, if the computer peripheral is a CRT, the state of a fluorescent screen can be changed by the impact of electrons in a physical transformation that is also visually apparent. Each display screen may be touch-sensitive, allowing a user to enter information onto the display screen via a virtual keyboard. On some clients, such as a desktop or smartphone, a physical QWERTY keyboard and scroll wheel may be provided for entering information onto the display screen.

Each client may run an operating system, such as a version of Microsoft Windows or Mac Leopard. Computer programs, including applications, are stored, e.g., in a hard drive, and execute on top of the operating system. Among these computer programs may a Web Browser, such as Microsoft Internet Explorer, Google Chrome, or Apple Safari for accessing data from the servers. This data may include the performance information that has been categorized and vetted, and may include the reports generated by the processes described herein.

Each server 210 to 213 may have a similar architecture. Only the architecture of server 210 is shown in detail. In this regard, server 210 includes a storage system 210a, e.g., RAID (Redundant Array of Inexpensive Disks), for storing data and computer programs, and one or more processing device(s) 210b (e.g., one or more microprocessors) and memory 210c (e.g., RAM) for executing computer programs. Each server may run an operating system (not shown), such as a version of Solaris or Linux. Computer programs, including those for hosting Web sites/portals and those that are described herein, may be stored, e.g., in storage system 210a, and execute on top of the operating system to perform the functions described herein.

Each server may host, or otherwise provide access to, information contained therein. For example, a user at a client 201 may sign onto a Web site hosted by server 210 (or, e.g., for which server 210 is gateway). In response, e.g., through an appropriate HTTP (hypertext transfer protocol) exchange, server 210 may provide, to client 201, a template for providing environmental information, as described in more detail below.

In the example of FIG. 2, server 210 may be used in implementing at least part of the processes described herein for reporting on environmental impacts of products and/or services. To this end, among the computer programs running on server 210 are template module 220, data module 221, and report module 222. In this regard, the word "module" is used to correlate computer-executable code to a particular function(s), and is not intended to reflect an organization of that code or to imply that such code is a separate program. As noted above, template module 220 hosts various templates, which a user at a client (e.g., 201) can access to provide performance information of the type described herein. Data module 221 receives information contained in those templates, extracts that information, and provides it to reviewers' computers 206, 207 for vetting. Report module 222 uses vetted and categorized performance information to generate various standard and customized reports, as described herein. The operation of the foregoing modules is described in more detail below.

Servers 211, 212 are referred to as source servers because they correspond to entities, such as owners, manufacturers, distributors, retailers or other suppliers of products and/or services that are being rated by the processes described herein. Each such server may include a database 211a, 212a containing performance information ("info") relating to products and/or services that are associated with that entity. Each database may include a computer program (not shown) for providing, or providing access to, the performance information stored therein. In this regard, one or more of the clients may be associated with a corresponding entity. These clients may be used to access a template, e.g., via network 215, to complete that template with performance information for products and/or services provided by the entity, and to provide that completed template to server 210. These features are described in more detail below.

Reviewer computers 206, 207 (which are also clients) are used by reviewers to vet the performance information obtained via the templates. The vetted performance information may be categorized by the reviewers. The vetted and categorized performance information may be stored in a database 224 on server 210 and may be used to generate reports, as described below.

Server 213 provides access to a modeling system, such as a BIM module 225. Other servers(s) (not shown) may be included in the network system to make different use of the vetted and categorized performance information produced by the processes described herein. In this example, the vetted and characterized performance information may be integrated into the BIM module to produce building-related reports, e.g., which compare the environmental impacts of products and/or services from various sources. For example, a user may access BIM module 225 via network 215 and, through appropriate interaction with server 210 obtain one or more reports containing environmental information about products and/or services used in construction that is modeled by BIM module 225. As described below, the environmental information may indicate the level of scientific robustness and transparency of that information.

Other examples of clients and servers on which the processes described herein may be implemented are provided below.

Figure 3:
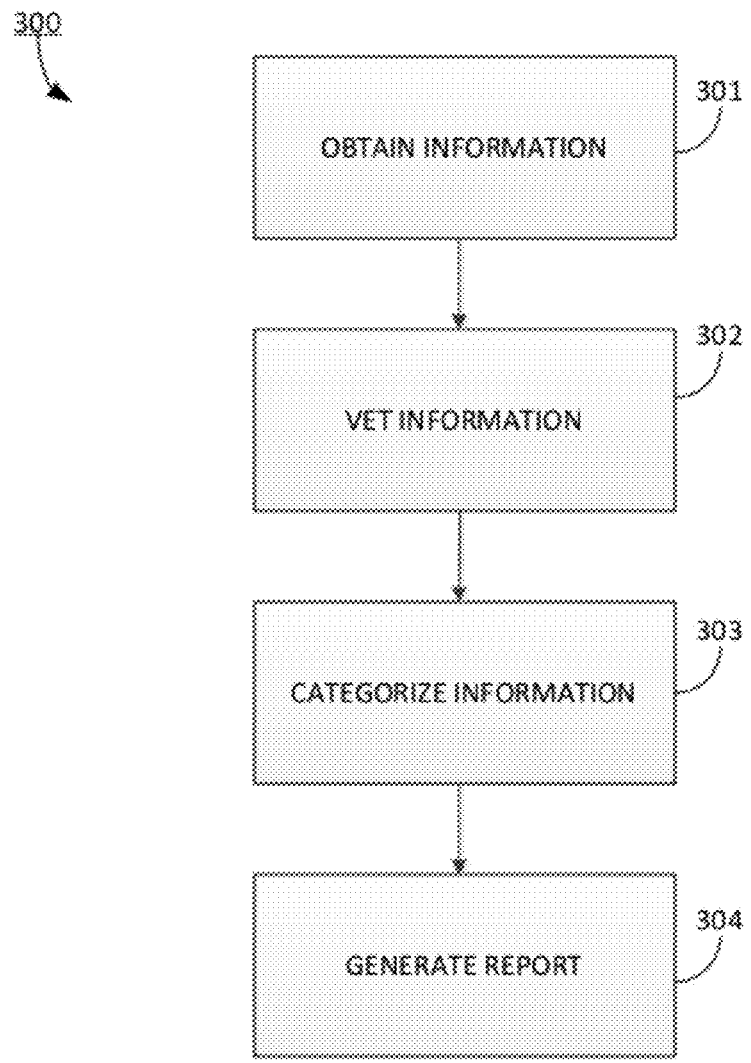
FIG. 3 is a flowchart showing a process depicted in FIG. 1.

FIG. 3 shows a process 300 for reporting on impacts of entities. Process 300 may be performed using the architecture of FIG. 2. Process 300 may be performed using template module 220, data module 221, and report module running on server 210 in conjunction with the other servers and clients shown in FIG. 2.

According to process 300, server 210 obtains (301), from various sources, performance information relating to products and/or services associated with, e.g., provided by, those sources. As noted, the entities may include, but are not limited to, owners, manufacturers, distributors, retailers or other suppliers of products and/or services that are being rated and reported on by process 300. As also noted, the performance information may include, but is not limited to, information relating to a product's effects on energy use, water use, renewable energy, human health, waste, indoor air quality, and the like. The performance information may also include information relating to environmental impact, human health, mechanical, safety, risk management impacts for use in the evaluation, and comparison and selection of products and services to advance high-performance building and health of the environment and people around the world. The performance information may also include supporting information regarding certifications and/or scientific methodologies. For example, the supporting information may include certifications associated with the performance information (e.g., a platinum, gold or silver BIFMA certification). The supporting information may also include information about the scientific methodologies used to arrive at the certifications and/or to obtain the performance information, along with the underlying data upon which the performance information and certifications is based.

The performance information may be obtained (301) directly from a database (e.g., 211a) maintained by a source (e.g., 211), and thereafter stored in a database 224 at server 210 (or elsewhere on network system 200). The source database 211a may contain performance information for products and/or services offered by the corresponding source. This performance information may be stored in compliance with predefined requirements and labels that enable it to be identified and categorized. For example, if the performance information relates to air quality associated with an HVAC system, the stored data may include appropriate identification tags in association with the stored data. The server(s) on which the source databases resides may each include a corresponding computer program and application programming interface (API), which allows template module 220 to access and retrieve the performance information. The performance information may be retrieved with, or without, user interaction, and stored in database 224.

In this regard, each source database may be populated using templates (see, e.g., FIGS. 4A and 4B) provided by template module 220, and hosted on a Web portal via server 210. The templates may be Excel® documents that contain fields 401 to 411 that correspond to performance information (in the example of FIGS. 4A and 4B, the performance information includes environmental information relating to the carpet industry). As indicated above, the templates may be, e.g., product, manufacturer or industry-specific, and may include predefined fields corresponding to different types of performance information. These fields may be standardized by industry, and may include various sub-fields, which may also be industry-specific. For example, the carpet industry may include standard fields. Users at the sources may manually complete the templates with the requested performance information. This information may then be stored in a source database for later retrieval.

Referring back to FIG. 3, alternatively, the performance information may be obtained (301) directly from the templates. For example, template module 220 may host the templates via server 210. Performance information in those templates may be conveyed to server 210 via network 215. The templates containing the performance information may be stored in database 224. In each case, the templates may be stored in conjunction with information that identifies the source.

The performance information may be extracted from the templates by data module 221. The extracted performance information may be stored in database 224 in association with appropriate identifiers. The extracted performance information may be transferred to, or accessed by, reviewer computers 206, 207. For example, the performance information may be transferred from server 210 to reviewer computers 206, 207, or to a database (not shown) associated therewith. Alternatively, the performance information may be accessed by reviewers from those computers. For example, the reviewers may sign onto a secure Web site hosted by server 210, from which the environmental information may be viewed.

As noted above, the reviewers may be experts in their fields, and may be knowledgeable about both the scientific methodologies (if any) used to obtain the performance information and the standards (if any) with which the performance information is compliant. For example, in the case of environmental information about institutional furniture, such experts may be knowledgeable about BIFMA standards, including the scientific methodologies used to arrive at the BIFMA certifications. The experts may also be familiar with the types of data used as a basis for certification, and the methods for gathering and analyzing such data.

The reviewers may vet (302) the performance information in order to determine its reliability. In an example, the performance information may be vetted to determine its levels of scientific robustness and transparency, which may be indicators of reliability. In this example, the reviewers may take various factors into account in determining the scientific robustness and transparency of environmental information provided by sources 211, 212. The factors described herein, including those presented below, are not limiting.

In the case of EPD-based environmental information, reviewers may assume that such information has a highest level of scientific robustness and transparency. For non-EPD information, a reviewer may determine whether the information is ISO-compliant LCA information. LCA is an aid in understanding the human health and environmental impacts of products and/or services. LCA is a technique to assess the environmental aspects and potential impacts associated with a product service, by: compiling an inventory of relevant energy and material inputs and environmental releases; evaluating the potential environmental impacts associated with identified inputs and releases; and interpreting the results to make an informed decision. ISO-compliance may include compliance at least with ISO 14044 and ISO 10400 (here, circa 2010).

In addition to the foregoing, the reviewers may determine whether the performance information provided by sources 211, 212 is certified by third parties who are internal or external to the organization providing the certification. The reviewers may also determine who created the LCA from which the performance information was obtained. The reviewers may also attempt to determine how reliable the performance information is. Reliability may be based on whether scientific processes were used to gather and analyze data to produce the performance information. In an example, the reviewers may base their assessment of a product and/or service, at least in part, on (1) LCA-based information, (2) natural resource use, (3) renewable energy use, (4) water efficiency/use, and greenhouse gas (GHG) emissions.

In an implementation, the reviewers categorize (303) the performance information based on its level of scientific robustness and transparency. For example, scientific information for each product and/or service may be categorized by associating that product and/or service with an appropriate bucket (i.e., category). In this example, there are five categories, ranging from a highest level of scientific robustness and transparency (e.g., a product and/or service that has an EPD) to a lowest level of scientific robustness and transparency or unknown (e.g., a product and/or service for which no performance information has been provided).

Server 210 receives the vetted and categorized performance information, ranks that information, and stores it in database 224. Server 210 may receive this vetted and categorized performance information directly from the reviewers, or it may access it via APIs associated with a reviewer database.

The following describes examples of ranked categories of performance information ranging, in order, from a highest level of scientific robustness (first category) and transparency to a lowest level of scientific robustness and transparency or unknown (fifth category).

The first category includes products or services with an LCA-based EPD that meets all requirements of ISO Standard 14025, in particular, the use of PCRs that are peer-developed and expert-approved and creation of ISO-compliant LCAs that are verified by an expert reviewer as being in alignment with the relevant PCRs.

The second category includes products or services with an LCA that is verified by a third-party expert as being in alignment with all requirements of ISO Standards 14040 and 14044, in particular, clear definition and use of scope, boundaries and metrics.

The third category includes products and services with an LCA that has been verified by an independent expert as being complete and comparable, yet has not been verified as being in alignment with all aspects of ISO Standards 14040 and 14044.

The fourth category includes products and services with an LCA which has not been verified by an independent expert, and is most likely an LCA developed internally by a manufacturer without any outside consultants and reviewers.

The fifth and lowest category includes all other products for which no LCA work has been provided in a publicly-available resource or a written document from the manufacturer.

Different and/or additional categories may be used in process 300. The categories may be stored in database 224 at server 210 for access by other systems. The categories may be updated as reviewers access and process additional environmental information. The number of categories, and criteria associated therewith, may also change as additional environmental information is evaluated.

Report module 222 may generate (304) reports using the vetted, categorized performance information. The reports may be generated by report module 222 or by report module 222 in conjunction with BIM module 225 on server 213. For example, BIM module 225 may provide report module 222 with a list of products and/or services that are to be used in a construction (e.g., a building, real estate development, community, etc.). Report module 222 may then generate a report providing information about, e.g., the environmental impacts of those products and/or services. Alternatively, BIM module 225 may simply request the categorized performance information from the database, and use that performance information to generate the reports within the BIM module. The BIM module may obtain the performance information through a Web-based API maintained by server 210, which is accessible to BIM module 225 and/or other programs requiring data access.

Generally speaking, the reports may include performance information for like products and/or services, which has been vetted and categorized as described above. Because the information is for like products, a user can compare the environmental (or other performance-related) impacts of those products. One useful feature of the reports 122 generated in this way may relate to a decision as to which products to purchase. Depending upon the type of BIM module that is used, the reports may be more detailed. For example, the reports may provide comparative information on the environmental impacts of selected products on a room level, a building level, a real estate portfolio level, and/or a community level. The reports may be standard or customized, e.g., for a user or a particular type of BIM module.

In this regard, manufacturers of building products around the world, and in the U.S. in particular, may experience frustration with the large number of sustainable product standards, certification programs and eco-labels, each of which may be based on a different set of core principles and benchmarks. They question whether investments in these tools make sense, given that there is now no single way system for evaluating products and services. Similarly, specifiers and purchasers of building products and services can be frustrated as they find the number of eco-labels overwhelming and wonder how to discern which ones are robust and transparent and which ones are encouraging green wash. As explained above, the processes described herein can be used to organize a broad range of independent expert verified performance data based on the 14000 series of standards developed for ISO by respected environmental scientists from around the world. Accordingly, the processes can provide access to quality data from diverse global sources. This reports generated by the processes may incorporate a linear process for opening a number of "open information boxes" moving from the largest to the smallest much as one would do in opening a Chinese nest of boxes, each one smaller than the preceding box. An example of this is demonstrated as follows:

Product Categories
   Broad Product Types
      Specific Product Types
         EPD Reports
            Product Performance Profiles
               EPD Report Components
                  GHG Emissions
                  Natural Resources Use
                  Renewable Energy Use
                  Water Efficiency
                  LCA Filter- Five Levels More specifically, a report generated by report module 222 may contain the foregoing information. The information may be nested in various Web pages, with each indentation above indicating access to a new Web page. In the above example, a first Web page may include "Product Categories" (e.g., floor covering). Clicking on a product category may retrieve a second Web page. The second Web page may include "Broad Product Types" (e.g., carpet). Clicking on a broad product type may retrieve a third Web page. The third Web page may include "Specific Product Types" (e.g., carpet tile). Clicking on a specific product type may retrieve a fourth Web page. The fourth Web page may include "EPD Reports" (e.g., EPD reports on carpet tiles from various manufacturers). Clicking on an EPD report may retrieve a fifth Web page. The fifth Web page may include "Product Performance Profiles" (e.g., reports generated by the vetting and categorizing described herein). From these reports, various EPD report components may be accessed, such as GHG emissions, natural resources use, renewable energy use, water efficiency, and category level (e.g., levels one to five above).

The reports are not limited to the above configuration, and may have any structure. For example, some products may not include EPD reports. In this case, the EPD reports' Web page may be circumvented, and the report may skip from "Specific Product Types" to "Product Performance Profiles". The EPD components may still be present in this example; however, they may not have come from an actual EPD.

The processes described herein are not limited to use with Web-based portals. Instead, the reports may be hard copies or may be accessible directly, e.g., not through the Web or using Web protocols.

All or part of the processes described herein and their various modifications (hereinafter referred to as "the processes") can be implemented, at least in part, via a computer program product, i.e., a computer program tangibly embodied in one or more information carriers, e.g., in one or more tangible, non-transitory machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Elements of different implementations described herein may be combined to form other implementations not specifically set forth above. Other implementations not specifically described herein are also within the scope of the following claims.

What is claimed is:

1. A method comprising:
   obtaining, via one or more computing devices, performance information relating to products and/or services, the performance information comprising supporting information, the supporting information relating to reliability of the performance information, the supporting information comprising information about different certifications given to the performance information and information about scientific methodologies used to arrive at the certifications and/or to obtain the performance information;
   wherein the performance information is reviewed to thereby produce vetted and ranked performance information;
   receiving, via the one or more computing devices, the vetted and ranked performance information, the vetted and ranked performance information comprising the performance information (i) that has been vetted for reliability based on at least some of the supporting information, and (ii) that has been ranked according to reliability based, at least in part, on at least one benchmark, the at least one benchmark comprising compliance with life cycle assessment methodology; and
   using at least some of the vetted and ranked performance information to generate a report for a product or service via the one or more computing devices, the report enabling access to vetted and ranked performance information for the product or service, the report providing information about an environmental impact or a sustainable impact of the product or service based on the vetted and ranked performance information for the product or service.

2. The method of claim 1, wherein the vetted and ranked performance information comprises environmental information that has been vetted for scientific robustness and transparency.

3. The method of claim 1, wherein obtaining the performance information comprises:
   providing templates to the sources, the templates comprising fields that correspond to parameters that comprise the performance information; and
   extracting the parameters from the templates.

4. The method of claim 3, wherein providing the templates comprises:
   hosting Web-based portals containing the templates, the Web-based portals being accessible via a network.

5. The method of claim 1, wherein obtaining the performance information comprises interacting with information databases to extract the performance information from the databases.

6. The method of claim 1, wherein using the vetted and ranked performance information to generate reports comprises:
   receiving product information from an information management system; and
   incorporating the vetted and product information into the report.

7. The method of claim 6, wherein the information management system is usable with a building information modeling (BIM) software system.

8. The method of claim 2, wherein scientific robustness is measured based on compliance at least with ISO 14044 and ISO 14040 circa 2010.

9. The method of claim 1, wherein the vetted and ranked performance information is assessed based on at least one of meeting data currency, data comprehensiveness, alignment with relevant product category rules, independent expert verification and transparency of data sources, and calculation processes.

10. One or more non-transitory machine-readable storage media storing instructions that are executable to perform operations comprising:
    obtaining performance information relating to products and/or services, the performance information comprising supporting information, the supporting information relating to reliability of the performance information, the supporting information comprising information about different certifications given to the performance information and information about scientific methodologies used to arrive at the certifications and/or to obtain the performance information;

wherein the performance information is reviewed to thereby produce vetted and ranked performance information;

receiving the vetted and ranked performance information, the vetted and ranked performance information comprising the performance information (i) that has been vetted for reliability based on at least some of the supporting information, and (ii) that has been ranked according to reliability based, at least in part, on at least one benchmark, the at least one benchmark comprising compliance with life cycle assessment methodology; and using at least some of the vetted and ranked performance information to generate a report for a product or service, the report enabling access to vetted and ranked performance information for the product or service, the report providing information about an environmental impact or a sustainable impact of the product or service based on the vetted and ranked performance information for the product or service.

11. The one or more non-transitory machine-readable storage media of claim 10, wherein the vetted and ranked performance information comprises environmental information that has been vetted for scientific robustness and transparency.

12. The one or more non-transitory machine-readable storage media of claim 10, wherein obtaining the performance information comprises:
providing templates to the sources, the templates comprising fields that correspond to parameters that comprise the performance information; and
extracting the parameters from the templates.

13. The one or more non-transitory machine-readable storage media of claim 12, wherein providing the templates comprises:
hosting Web-based portals containing the templates, the Web-based portals being accessible via a network.

14. The one or more non-transitory machine-readable storage media of claim 10, wherein obtaining the performance information comprises interacting with information databases to extract the performance information from the databases.

15. The one or more non-transitory machine-readable storage media of claim 10, wherein using the vetted and ranked performance information to generate reports comprises:
receiving product information from an information management system; and
incorporating the vetted and product information into the report.

16. The one or more non-transitory machine-readable storage media of claim 15, wherein the information management system is usable with a building information modeling system.

17. The one or more non-transitory machine-readable storage media of claim 11, wherein scientific robustness is measured based on compliance at least with ISO 14044 and ISO 14040 circa 2010.

18. The one or more non-transitory machine-readable storage media of claim 10, wherein the vetted and ranked performance information is assessed based on at least one of meeting data currency, data comprehensiveness, alignment with relevant product category rules, independent expert verification and transparency of data sources, and calculation processes.

19. A system comprising:
memory to store instructions that are executable; and
one or more servers to execute the instructions to perform operations comprising:
obtaining performance information relating to products and/or services, the performance information comprising supporting information, the supporting information relating to reliability of the performance information, the supporting information comprising information about different certifications given to the performance information and information about scientific methodologies used to arrive at the certifications and/or to obtain the performance information;

wherein the performance information is reviewed to thereby produce vetted and ranked performance information;

receiving the vetted and ranked performance information, the vetted and ranked performance information comprising the performance information (i) that has been vetted for reliability based on at least some of the supporting information, and (ii) that has been ranked according to reliability based, at least in part, on at least one benchmark, the at least one benchmark comprising compliance with life cycle assessment methodology; and using at least some of the vetted and ranked performance information to generate a report for a product or service, the report enabling access to vetted and ranked performance information for the product or service, the report providing information about an environmental impact or a sustainable impact of the product or service based on the vetted and ranked performance information for the product or service.

20. The system of claim 19, wherein the vetted and ranked performance information comprises environmental information that has been vetted for scientific robustness and transparency.

21. The system of claim 19, wherein obtaining the performance information comprises:
providing templates to the sources, the templates comprising fields that correspond to parameters that comprise the performance information; and
extracting the parameters from the templates.

22. The system of claim 21, wherein providing the templates comprises:
hosting Web-based portals containing the templates, the Web-based portals being accessible via a network.

23. The system of claim 19, wherein obtaining the performance information comprises interacting with databases maintained by the sources to extract the performance information from the databases.

24. The system of claim 19, wherein using the vetted and ranked performance information to generate reports comprises:
receiving product information from an information management system; and
incorporating the vetted and product information into the report.

25. The system of claim 24, wherein the information management system is usable with a building information modeling system.

26. The system of claim 20, wherein scientific robustness is measured based on compliance at least with ISO 14044 and ISO 14040 circa 2010.

27. The system of claim 19, wherein the vetted and ranked performance information is assessed based on at least one of meeting data currency, data comprehensiveness, alignment with relevant product category rules, independent expert verification and transparency of data sources, and calculation processes.

* * * * *